Oct. 24, 1944.  W. J. KLAASSEN  2,361,035
WAX-OIL SEPARATION
Filed Aug. 1, 1942
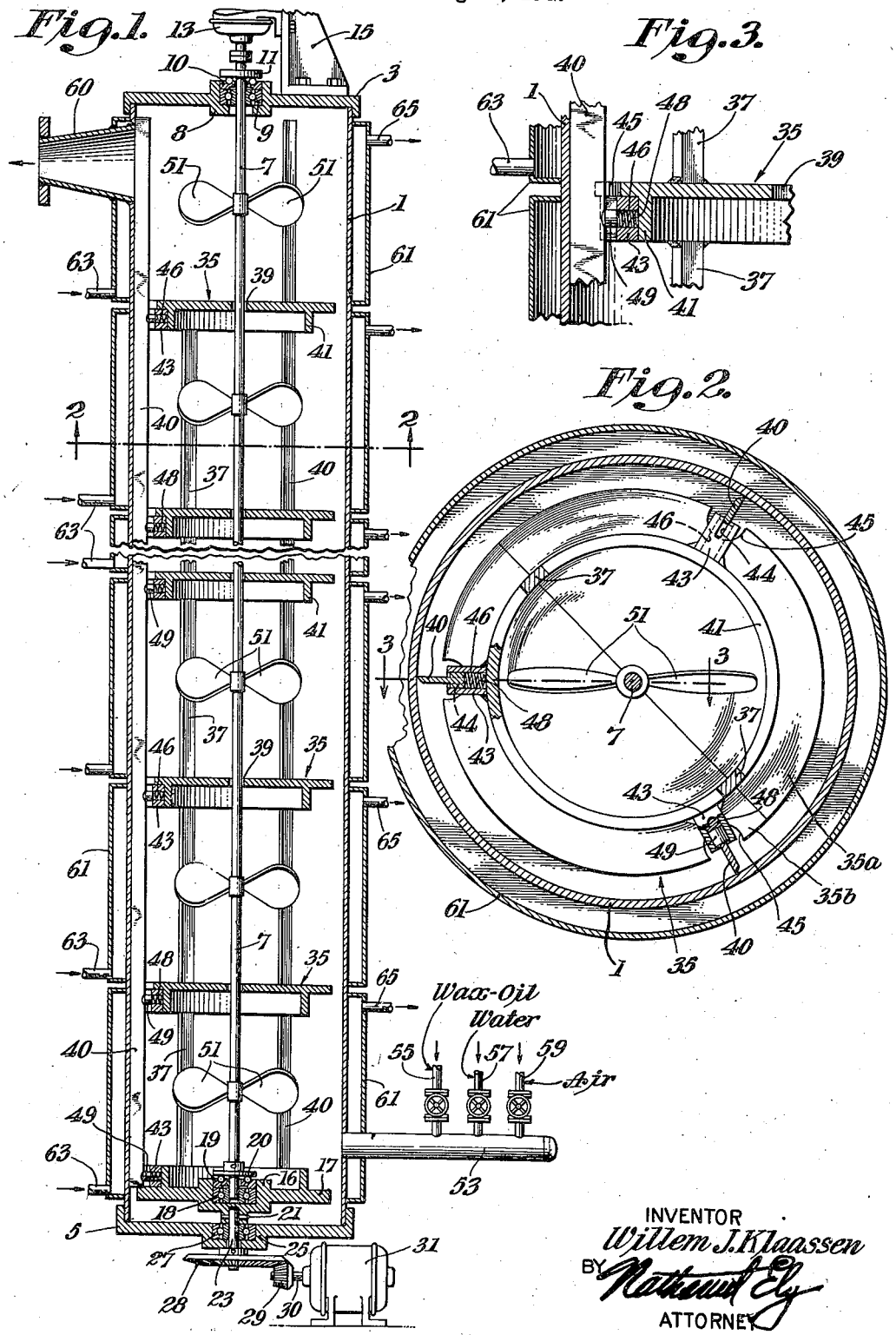
INVENTOR
Willem J. Klaassen
BY Nathaniel Ely
ATTORNEY Patented Oct. 24, 1944

2,361,035

UNITED STATES PATENT OFFICE 2,361,035

WAX-OIL SEPARATION

Willem J. Klaassen, Jersey City, N. J., assignor to The Lummus Company, New York, N. Y., a corporation of Delaware Application August 1, 1942, Serial No. 453,194

13 Claims. (Cl. 196—18)

This invention relates to the separation of wax-oil mixtures and more particularly to an improved method of and an apparatus for continuously agitating and cooling a dispersion of a hydrocarbon wax-oil mixture and one or more fluids immiscible therewith to avoid shock chilling of the dispersion.

In the process of separating wax from oil as disclosed in the prior patents of A. H. Schutte, Nos. 2,168,140, 2,168,141, 2,168,142, 2,168,143, and 2,168,306, issued August 1, 1939, a wax-oil mixture such as a slack wax or a wax-bearing oil, while in liquid condition, is agitated or emulsified with an immiscible fluid, and the resulting dispersion is cooled to solidify the portion of the wax desired to be separated. In the commercial operation of this process, it has been found that water and air, used together, are most satisfactory as the immiscible or nonsolvent fluid and form a dispersion having the desired characteristics. The cooled, partially solidified dispersion is then passed to a centrifugal filter or the like, wherein the solidified wax is separated from the remaining liquid.

In the operation of the Schutte process as generally practiced heretofore, the wax-oil-water-air dispersion is conveniently formed by passing the wax-oil mixture, the water, and the air through a rotary pump or other suitable agitating device of a similar nature. The resulting mixture is circulated through the pump a sufficient number of times so that it has the desired dispersion characteristics. During such circulation, the dispersion is cooled to effect the desired solidification by the direct addition thereto of sufficient cooling water. This procedure results in shock chilling of the wax.

Although this procedure is generally satisfactory for the deoiling of crystalline wax-containing stocks having a relatively low oil content and/or containing no petrolatum such as slack wax or the like, it has been found that shock chilling is not suitable for the treatment of other types of wax-oil mixtures. In particular, those mixtures which contain a relatively high percentage of oil (above approximately 30%) or which contain petrolatum or amorphous wax are not amenable to satisfactory treatment by this process. With such a stock, shock chilling results in the formation of a partially or totally "amorphous" wax, which appears to consist of improperly solidified crystalline wax and any amorphous wax or petrolatum that may be present. This "amorphous" wax is essentially a liquid and, therefore, behaves as "oil" and, consequently, can not be separated from the oil proper in a centrifugal filter or the like.

It appears that, when such a wax-oil mixture is agitated and cooled with air and water, the air is adsorbed on the surface of the wax crystals, thus forming a colloidal dispersion of wax crystals in air (an aerogel), in which the air is the continuous phase. This aerogel is a substantially rigid solid structure, the rigidity of which is primarily due to the presence of the wax crystals. The air as the continuous medium provides innumerable channels throughout the wax aerogel structure. The oil and water are present as an admixture in these air channels and may be separated from the wax crystal structure as by centrifugal action.

Accordingly, the formation of well defined wax crystals is essential for successful operation. Without such crystalline wax formation, the air can not be satisfactorily incorporated into the wax-oil-water-air dispersion, and a satisfactory separation of the wax from the oil can not be accomplished.

When such a wax-oil dispersion is cooled down from the liquid state, each wax constituent therein reaches in turn its saturation point, i. e., the point at which it would crystallize under conditions of perfect equilibrium. The rate of nucleation (rate at which nuclei are formed) of a particular wax constituent is small immediately below its saturation point but increases to a maximum as the degree of undercooling of the dispersion is increased. Similarly, the rate of nuclear growth of the crystallized wax constituent also increases as the temperature of the dispersion falls below its saturation point; and this rate also attains a maximum, which may be, with respect to temperature, either above or below the point of maximum nuclei formation. At a very high degree of undercooling, the viscosity of the wax-oil dispersion increases; and this increased viscosity tends to reduce both the rate of nucleation and the rate of nuclear growth to a negligible extent. Consequently, the crystallization of a particular wax constituent should take place under such conditions that the degree of undercooling brings both the rate of nucleation and the rate of nuclear growth as close to their respective maxima as possible.

Furthermore, the saturation point of a particular wax constituent is lowered as that constituent crystallizes out. Therefore, in order to maintain the desired degree of undercooling, the temperature of the crystallizing dispersion should be lowered at such a rate that it keeps pace with the decreasing saturation temperature. A definite rate of cooling must thus be applied to the wax crystallization, and this rate must not be exceeded. If such maximum rate of cooling is exceeded, the gap between the temperature of the crystallizing dispersion and the saturation temperature tends to widen, and the degree of undercooling may fall in a range where no appreciable nucleation and nuclear growth occur. As a result, a part of the crystalline wax fails to crystallize and remains amorphous. Accordingly, shock chilling affords a satisfactory wax-oil separation only if the wax present in the stock is capable of instantaneous crystallization. In case of low oil content waxes containing no petrolatum, this condition is fulfilled. The crystallization of wax is retarded by any one or more of the following factors, however, which make the use of shock chilling inapplicable:

1. A low proportion of wax
2. The presence of petrolatum
3. A high proportion of oil
4. A high viscosity of the oil Although the above explanation satisfactorily accounts for the wax-oil separation by this process, I nevertheless do not desire to be strictly bound thereby.

It has now been found that, in the separation of a wax-oil stock, particularly a high oil content stock, or an amorphous wax-containing stock, according to the Schutte process, gradual chilling of the wax-oil dispersion is necessary in order to effect the desired wax separation and to obtain a readily separable mixture. This gradual chilling can be so controlled that the nucleation rate and the rate of nuclear growth are both as close to their respective maxima as possible as the temperature is lowered whereby the maximum crystallization of wax takes place and the subsequent separation thereof is effectively accomplished. This gradual chilling can also be controlled so as to lower the temperature of the crystallizing mass at such a rate that it keeps pace with the decreasing saturation temperature, which decreases as the wax is being crystallized. This improved control over the rate of cooling of the wax provides an improved wax crystalline structure and affords a means to control the structure of the resulting solidified wax. Consequently, the wax structure can be made to provide the most rapid and effective separation of the oil. This improved crystalline structure results in a better and much more effective separation of the solidified wax from the oil in a centrifugal filter.

The principal object of my invention is to provide an improved procedure for cooling the wax-oil-water-air dispersion formed in the Schutte wax-oil separation process whereby shock chilling of the wax is avoided.

A further object of my invention is to control the cooling of the wax-oil-water-air dispersion so that the formation of well defined wax crystals is promoted whereby there is formed a wax structure from which the oil can be more readily and effectively removed by centrifugal filtration or the like.

Another object of my invention is to provide an agitating apparatus in which the chilling or cooling of the wax-oil-water-air dispersion is simultaneously effected in a gradual manner so that shock chilling and the adverse effects thereof are avoided.

Still another object of my invention is to provide an improved separation of a wax-oil mixture having a relatively high oil content or containing petrolatum or amorphous wax.

Further objects and advantages of my invention will be apparent from the following description thereof taken in connection with the accompanying drawing, in which:

Fig. 1 is a vertical section through one form of embodiment of my improved apparatus for effecting a gradual chilling of the dispersion;

Fig. 2 is a horizontal cross section taken substantially along the line 2—2 of Fig. 1;

Fig. 3 is an enlarged fragmental view taken substantially along the line 3—3 of Fig. 2 and showing some of the details of construction of my improved apparatus.

In accordance with my invention, I simultaneously agitate and gradually cool the wax-oil-water-air dispersion to carefully solidify the crystalline wax and to overcome the disadvantages of shock chilling. As a result, I find that the dispersion of solidified wax is more readily separated by centrifugal means and that a better separation of wax from oil is accomplished. In particular, my improved operation now permits the Schutte process to be successfully applied to the dewaxing of a waxy oil stock.

My improved apparatus comprises an agitating and cooling chamber 1, preferably cylindrical in construction, which is provided with top closure plate 3 and bottom closure plate 5. This chamber is desirably vertically arranged for reasons which will appear hereinafter. Centrally located within chamber 1 is a rotatable shaft 7, which passes through the central depressed apertured section 8 in top closure plate 3. This depressed section contains a ball bearing 9 or the like and a thrust bearing 10, through which shaft 7 passes. Collar 11, which rests on thrust bearing 10, is mounted on shaft 7 and aids in supporting this shaft within chamber 1. Shaft 7 may be conveniently driven by a suitable motor 13 attached to its upper end. This motor may be desirably supported by bracket 15, which in turn may be secured to the top closure plate 3.

The lower end of shaft 7 terminates within the depressed apertured section 16 centrally located in the baffle or supporting plate 17. This depressed section contains a ball bearing 18 or the like and a thrust bearing 19, through which shaft 7 passes. Shaft 7 is also provided with collar 20, which rests on thrust bearing 19 and which aids in supporting shaft 7 within chamber 1.

Supporting plate 17 is itself mounted on and suitably secured as by the key 21 to the short shaft or spindle 23. This short shaft passes through the depressed apertured section 25 centrally located in bottom closure plate 5. A ball bearing 27 or the like, through which shaft 23 passes, is contained in this depressed section. The lower end of the short shaft 23 may be conveniently provided with a bevel gear 28, which engages the bevel gear 29. This latter gear may be desirably mounted on shaft 30, which may be driven by a suitable motor 31. The construction of plate 17 is desirably such that shafts 7 and 23 can be independently and freely driven at greatly varying speeds for purposes more fully explained hereinafter.

In accordance with my invention, chamber 1 is divided into a plurality of agitating and cooling compartments or zones by means of horizontal baffles 35. These baffles may be spaced at any desired intervals, but preferably they are so positioned that all the separate compartments have substantially the same size. Each baffle 35 is supported and held in place by a pair of individual supporting members 37, which may be conveniently attached thereto as by welding to the lower side thereof. These supporting members are also suitably attached to the upper surface of the next lower baffle as shown in Fig. 3 with the lowermost pair of supporting members attached to and carried by the supporting plate 17. Accordingly, when the plate 17 is rotated by means of motor 31, the several baffles 35 are also correspondingly rotated. If desired, more than two supporting members may be used.

Each baffle is desirably formed in two semicircular sections 35a and 35b so that the baffles can more readily be inserted in position particularly with respect to shaft 7. Any suitable provision may be made for insuring that the two sections remain in position with respect to each other. In addition, each baffle 35 is provided with a small central circular opening 39, through which shaft 7 passes in a freely rotatable manner. The diameter of the baffles 35 is sufficiently smaller than that of chamber 1 to provide for the free flow of fluids in the space therebetween.

In addition to dividing chamber 1 into a plurality of individual compartments, baffles 35 also carry scraper blades 40, which are adapted to closely contact the inner surface of chamber 1 as the baffles are rotated. Any number of scraper blades found desirable or necessary may be used although three have been found satisfactory. For this purpose, each baffle is provided with a downwardly depending circular flange 41 inwardly spaced from the periphery of the baffle. This flange, which may be suitably attached to the baffle or integrally formed therewith, is provided with a plurality of outwardly extending lugs or projections 43, which are suitably slotted in a vertical plane as at 44 to carry the respective scraper blades 40. Baffles 35 have cutaway or recessed sections 45 corresponding with lugs 43 to accommodate the scraper blades. Each lug 43 has a radially extending horizontal bore 46, which contains a spring 48 that bears against a pin 49 carried therein. Pins 49 in turn bear against or may be attached to the respective scraper blades 40 and, under the force exerted by springs 48, insure that blades 40 are always in contact with the inner wall of chamber 1. As indicated, scraper blades 40 preferably extend substantially along the entire length of the homogenizing and cooling chamber so that the entire inner surface thereof is subjected to their action. It is to be noted that supporting members 37 may be desirably attached to flanges 41 as shown in Fig. 3. It is also to be noted that supporting plate 17 and baffles 35 have substantially the same construction except that plate 17 is inverted with respect to baffles 35 and is somewhat larger so that it can vertically support the edges of the blades 40.

Shaft 7 is provided with a plurality of agitating blades or paddles 51, which are suitably attached thereto in any well known manner. There may be several pairs of such blades in each agitating and cooling compartment; but preferably each compartment has only one pair of blades, which are desirably spaced substantially equally from the two baffles forming the compartment. The purpose of such blades is to agitate the mixture of materials which passes upwardly through chamber 1. As will be noted, these materials are introduced into the lowermost compartment through feed inlet manifold 53, which desirably discharges such materials into the lower portion of the compartment below the lowermost agitating blades 51. This manifold itself is provided with a plurality of inlet pipes such as 55, 57, and 59, through which the individual materials are introduced into chamber 1. The uppermost compartment is provided with the discharge nozzle 60, through which the final dispersion is discharged to a centrifugal separator (not shown).

Chamber 1 is also provided with a plurality of cooling jackets 61, which may be arranged in any desired fashion. Preferably, however, each compartment has its own individual cooling jacket so that the temperature of the contents thereof may be more closely controlled. Cooling medium inlet and outlet pipes for these jackets are respectively provided at 63 and 65.

In one particular embodiment of my invention, chamber 1 was divided into nine substantially equally sized compartments. There was approximately ⅜ inch between the baffles and the inside wall of the chamber, which had an internal diameter of 6 inches. The space between baffles was about 10 inches.

In the operation of my invention, the desired wax-oil mixture to be separated is introduced through inlet pipe 55 in liquid condition. A suitable nonsolvent, nonreactive liquid such as water and a suitable inert, nonsolvent gas such as air are introduced through the respective inlet pipes 57 and 59. The resulting mixture in manifold 53 is introduced into the lowermost compartment, wherein it is agitated and intimately mixed at least partially by means of the respective pair of agitating blades 51. The temperature of the incoming water and air must be at least as high as that of the molten wax-oil mixture so that the materials can be maintained in the liquid state in manifold 53 whereby premature or shock chilling of the mixture can be avoided. It has also been found desirable to maintain the contents of the lowermost compartment substantially in a liquid condition during the initial agitation thereof in order to avoid the adverse effects of shock chilling; and for this purpose warm water or other suitable heating medium may be circulated through the respective jacket 61. It is entirely feasible, however, to initiate the cooling in this lowermost compartment; but, in such case, the amount of cooling should be very slight so as to avoid any shock chilling. Preferably, the mixture of materials is subjected to initial agitation in the lowermost compartment. If desired, however, the mixture may be preliminarily agitated before introduction into chamber 1; in such case, a suitable agitating device such as a rotary pump (not shown) may be installed in manifold 53 after inlet pipe 55.

Because of the continuous introduction of the materials through manifold 53, the partially agitated admixture in the lowermost compartment is continuously forced upwardly by displacement around the lowermost baffle 35 through the space between such baffle and the chamber wall into the next upper compartment. A unidirectional flow of materials is thus established. In this next upper compartment the partially agitated admixture undergoes further agitation by means of the respective pair of agitating blades 51 and simultaneously is subjected to a gradual cooling effect. This gradual cooling is effected by indirect heat exchange with a suitable cooling medium circulating through the respective cooling jacket 61. According to the type of wax-oil mixture undergoing separation and the conditions maintained in this next upper compartment, partial solidification of the resulting dispersion may or may not occur therein. The dispersion in this compartment is also continuously forced upwardly around the next upper baffle for continued agitation and chilling throughout chamber 1 and, after being cooled to the desired degree, is discharged from the uppermost compartment through nozzle 60 so that the desired wax-oil separation can be effected. Nozzle 60 preferably has a diameter considerably larger than that of inlet manifold 53 so that it does not become plugged by the discharging partially solidified dispersion. Since the gradual cooling of the dispersion is effected indirectly, some wax is deposited on the wall of chamber 1; but this deposit of wax is continuously removed by the action of the moving scraper blades 40.

Generally, it is desirable to effect the agitation under a superatmospheric pressure and to discharge the resulting dispersion at atmospheric pressure. The higher the pressure in chamber 1, the more air will be incorporated into the dispersion, and the more porous will the resulting wax structure be. The agitation may also take place at atmospheric pressure if desired. Where pressure operation is employed, suitable stuffing boxes (not shown) must be provided for shafts 7 and 23 to prevent the loss of pressure from chamber 1.

At no time during the passage of the dispersion through chamber 1 is it subjected to sudden or shock chilling. The cooling effect throughout is gradual in nature, and only a slight degree of cooling is accomplished in each compartment. For example, in the deoiling of slack wax or the like, a temperature drop of 1 to 2° F. per compartment is found most satisfactory; and, in the dewaxing of a wax-containing oil or the like, a temperature drop of several degrees but preferably not materially in excess of 5° F. is most desirable. Such gradual cooling rates, as compared to shock chilling wherein the wax-oil dispersion is suddenly and immediately subjected to a cooling action, permit and facilitate the proper formation and growth of the wax crystals. Interference with this crystalline formation and growth by any oil and/or petrolatum that is present is substantially eliminated by the controlled gradual cooling action, which provides sufficient time for the wax crystals to form and to grow into the desired structure. The result is that a greatly improved solidified wax structure is obtained; and, consequently, a better separation of the wax from the oil is accomplished.

It will be appreciated that the rate of cooling of and, hence, the time of residence of the wax-oil dispersion in chamber 1 depends principally on the particular stock being treated. For example, in the dewaxing of a waxy Tupengato (Argentine) gas oil stock, I have obtained a highly successful separation with a residence time of ½ hour or more of the wax-oil dispersion in chamber 1. The precise lower limit is not known; but, from my experimental results, it appears that, at the least, several minutes' residence time is necessary to effect the desired gradual cooling and to obtain a successful separation.

The cooling medium circulated through jackets 61 may comprise any suitable heat absorbing material. Generally, in a deoiling operation, cold water may be used. In dewaxing operations, however, where the final temperature is considerably lower, sufficiently cold water may not be available; and it may be necessary to resort to artificially cooled brine. Alternatively, ammonia may be used as the cooling medium. Where water is used to effect the cooling, the flow thereof is controlled by its ingoing and outgoing temperatures, which may be conveniently measured by thermometers (not shown) placed in pipes 63 and 65, respectively. Where ammonia is used as the cooling medium, it is introduced through line 63 into the lower portion of the jacket, wherein it is vaporized by reason of the heat transfer. The resulting vapors are removed through line 65. The temperature of such ammonia may be controlled by its pressure, which may be measured by suitable gauges (not shown) mounted in jackets 61. If desired, automatically operated flow controlling devices may be used. It will be appreciated that the apparatus is suitably insulated so that the desired cooling conditions can be maintained.

The flow of cooling medium through each jacket is governed by the amount and the rapidity of cooling to be accomplished in each compartment. The flow is always so controlled, however, that only a gradual cooling takes place. It has been found desirable to effect the initial cooling in a more gradual manner than the final cooling; i. e., the temperature gradation in the initial cooling compartments is smaller than that in the final compartments. In deoiling operations in particular, it is especially desirable to effect the initial cooling most gradually down to 5° F. below the melting point of the slack wax, whereafter the temperature gradation may be somewhat increased until the final discharge temperature is attained.

In this connection, the use of the baffles has a particularly important advantage in that the combined agitating and cooling in any particular compartment or zone may be carried on substantially independently of the similar operations being simultaneously effected in adjoining compartments or zones. Thus, these baffles help to maintain the desired temperature gradation throughout chamber 1; and there is substantially no commingling of the dispersions in the several compartments since intermixing of these dispersions is almost completely hampered by the baffles except for the continuous movement upwardly by displacement. A fully controlled cooling of the dispersion results.

It is to be noted that the agitating blades and the baffles and scraper blades are freely and independently and separately rotatable. To effect the desired agitation, the shaft 7 carrying the agitating blades is rotated by motor 13 at a relatively high speed in the neighborhood of 1,000 R. P. M., for example. On the other hand, baffles 35 and scraper blades 40 are rotated by motor 31 at a relatively slow speed generally in the neighborhood of several R. P. M. or less, which is sufficient to scrape from the wall of chamber 1 the wax deposited thereon by reason of the indirect cooling action.

My invention is applicable to the separation of substantially any type of wax-oil mixture containing crystalline wax and may also be used in the separation of a mixture of crystalline waxes into desired wax fractions. It may be desirably applied to the deoiling of a slack wax with materially improved operation, but it is particularly applicable to the processing of paraffin distillates, petrolatum-containing stocks, and other high oil content stocks. I wish to particularly emphasize that my process can effectively handle stocks containing petrolatum, the presence of approximately ½% or more of which seriously interferes with the crystallization of the wax on shock chilling thereof, and that my process can also effectively handle stocks containing relatively large amounts of oil, the presence of about 30% or more of which prevents the obtaining of the desired results on shock chilling of the stock. Although I have described my invention in connection with the formation of a dispersion of a wax-oil mixture with water and air, it is equally applicable to the formation of a dispersion of a wax-oil mixture with air alone. It is also applicable to the formation of a dispersion or aerogel consisting solely of wax and air.

A typical stock which can be successfully dewaxed by means of my invention comprises the Tupengato (Argentine) wax-containing gas oil, which has a melting point of about 82° F. This stock was warmed to about 90° F. and admixed with water and air, and the resulting mixture was introduced into the lowermost compartment at substantially this temperature. The mixture was agitated in chamber 1, and the dispersion formed was subjected to continued agitation and a gradual cooling with a temperature gradation of about 5° F. per compartment. The dispersion, chilled to a final temperature of 45° F., was discharged through nozzle 60 for the desired separation, which was cleanly and sharply accomplished. On the other hand, when the dispersion of this stock was shock chilled, only an ineffective separation as by centrifugal filtration was possible with a material portion of the wax fraction appearing in the filtrate, the melting point of which did not materially differ from that of the small amount of filter cake obtained.

My invention is also applicable to a deoiling operation, in which a slack wax having a melting point of 110° F. was admixed with water and air, and the resulting mixture was introduced into the lowermost compartment at a temperature of approximately 115° F. During its passage through chamber 1, the dispersion formed by means of the agitating blades was subjected to gradual cooling. The cooling in the initial cooling zones was most gradual with a temperature drop of approximately 1° F. per compartment. The final dispersion was discharged through nozzle 60 at a temperature of about 95° F.

Although water constitutes a suitable nonsolvent, nonreactive liquid for this separation, other liquids such as brine solutions or alcohols such as methyl alcohol or ethyl alcohol may also be used. Similarly, other inert, nonsolvent gases such as carbon dioxide or nitrogen may be substituted for air. It is to be noted, however, that both water and air are admirably suited for this process because of their cheapness and ready availability.

Although a vertical arrangement of my combined agitating and cooling apparatus is preferable, such apparatus may also be satisfactorily arranged in other positions such as horizontal. When the apparatus is horizontally arranged, however, it is desirable to position inlet manifold 53 so that it feeds into the lower side of the chamber and nozzle 60 so that it discharges from the upper side of the chamber.

It will be appreciated that the application of my invention is not necessarily limited to the separation of a wax-oil mixture. It may also be advantageously applied to the separation of other types of mixtures which are amenable to separation by the Schutte process. In this connection, attention is called to the prior copending applications of Schutte, Serial Number 274,412, filed May 18, 1939, Serial Number 411,646, filed September 20, 1941, Serial Number 411,647, filed September 20, 1941, and Serial Number 411,648, filed September 20, 1941, now patents, Nos. 2,296,456; 2,296,457; 2,296,458; and 2,296,459, respectively, all dated September 22, 1942, wherein the Schutte process is applied to the separation of a mixture of at least two organic compounds or a solution of an organic compound in an inorganic liquid such as water, which compounds have different melting points and at least one of which is crystalline. Furthermore, my improved apparatus itself is applicable to the preparation of other types of dispersions or similarly agitated mixtures.

Although I have described a preferred form of embodiment of my invention, I am aware that modifications may be made thereto; therefore, only such limitations as appear in the claims appended hereinafter should be applied.

I claim:

1. A combined agitating and cooling apparatus comprising a chamber having closed ends, means to introduce in liquid condition a mixture of materials to be agitated into one end of the chamber, baffle plates within said chamber to divide it into a plurality of compartments defined by the chamber wall and adjacent baffle plates, said baffle plates having a cross-sectional area slightly less than that of the chamber to permit continuous flow of the mixture of materials through said chamber, means within each compartment to agitate said mixture of materials during its passage therethrough, means to subject each compartment to a controlled amount of indirect cooling to effect a gradual chilling and a partial solidification of the dispersed mixture therein, means to continuously remove from the internal surface of said chamber any solid material deposited thereon, and means to remove the cooled dispersed mixture from the other end of said chamber.

2. An apparatus for the combined agitating and cooling of a wax-oil dispersion, which comprises a vertical cylindrical chamber having upper and lower closure plates, means to introduce in liquid condition a mixture of a wax-oil mixture, a non-solvent, nonreactive liquid, and an inert, nonsolvent gas into the lower end of the chamber, circular horizontal baffle plates within said chamber to divide it into a plurality of compartments defined by the chamber wall and adjacent baffle plates, said baffle plates having a diameter slightly less than that of the chamber to permit continuous flow of such mixture through the annular space between said plates and said chamber, agitating blades within each compartment to agitate such mixture, a vertical central shaft within such chamber, said agitating blades being attached thereto, means to rotate this shaft at a relatively high rate of speed, a plurality of jackets surrounding said chamber, means to circulate a cooling medium in controlled amounts through said jackets to effect a gradual cooling and a partial solidification of the resulting dispersion during passage thereof through each compartment, scraping means in contact with the internal surface of said chamber to remove any solidified wax deposited thereon, said scraping means being rotatable independently of the agitating blades, means to rotate said scraping means at a relatively low rate of speed, and means to remove the cooled dispersion from the upper end of the chamber.

3. An apparatus for the combined agitating and cooling of a wax-oil dispersion, which comprises a vertical cylindrical chamber having upper and lower closure plates, means to introduce in liquid condition a mixture of a wax-oil mixture, a nonsolvent, nonreactive liquid, and an inert, nonsolvent gas into the lower end of the chamber, circular horizontal baffle plates within said chamber to divide it into a plurality of compartments, said baffle plates having a diameter slightly less than that of the chamber to permit continuous flow of such mixture therethrough, means to support said baffle plates within said chamber, agitating blades within each compartment to agitate such mixture, a vertical central shaft within such chamber passing only through the upper closure plate, said agitating blades being attached thereto, said baffle plates permitting free passage of the vertical shaft therethrough, a supporting plate adjacent the lower closure plate, the lower end of said vertical shaft terminating in said supporting plate, a second vertical central shaft within such chamber passing only through the lower closure plate, said supporting plate being attached thereto, a plurality of scraper blades in contact with the internal surface of said chamber, said scraper blades being carried by said supporting plate and said baffle plates, means to rotate the first shaft at a relatively high rate of speed, means to rotate the second shaft at a relatively low rate of speed, said supporting plate permitting said shafts to be rotated independently of each other, a plurality of jackets surrounding said chamber, means to circulate a cooling meduim in controlled amounts through said jackets to effect a gradual cooling and a partial solidification of the wax in the resulting dispersion, and means to remove the cooled dispersion from the upper end of the chamber.

4. The apparatus as claimed in claim 3, in which each compartment is provided with an individual cooling jacket and which includes means to pass a cooling medium through each jacket in controlled amount.

5. The apparatus as claimed in claim 3, which includes means to circulate a heating medium in controlled amount through the jacket for the lowermost compartment, into which the mixture is introduced, and means to circulate a cooling medium in controlled amounts through the jackets for the remaining compartments.

6. The apparatus as claimed in claim 3, in which the circular baffles are substantially equally spaced from each other to divide the chamber into a plurality of equally sized compartments and in which a pair of agitating blades is substantially centrally positioned within each compartment.

7. An apparatus for agitating and cooling a wax-oil mixture for separation thereof, which comprises means forming an elongated cylindrical chamber, means for passing the mixture longitudinally through said chamber, a rotor mounted for rotation within the chamber coaxially of the latter and including a series of transverse baffles located at points spaced along the chamber and formed and arranged to restrict the passage of the mixture and scraper means to remove wax deposited upon the wall of the chamber, another rotor mounted for rotation within the chamber coaxially of the latter and including a plurality of agitating devices located between said baffles, means for rotating said rotors at different rates of speed for wax removal by the scraper means of the first rotor and for agitation of the mixture by the agitating devices of the second rotor, and jacket means surrounding the chamber for circulation of cooling fluid to cool the mixture progressively and gradually in its passage through the chamber by indirect heat exchange.

8. The method of slowly cooling a crystalline wax-containing wax oil mixture to form a wax aerogel for the separation of the oil from the wax, which comprises admixing such mixture, while in liquid condition, with water and air, continuously introducing such admixture into the lower end of an agitating and cooling chamber composed of a plurality of individual agitating and cooling zones, causing such admixture to flow continuously through said zones in series by displacement by the continuous introduction thereof, restricting the passage of the admixture from zone to zone, simultaneously violently agitating the admixture mechanically in said zones, gradually chilling the resulting dispersion during agitation thereof in and passage thereof through each zone by indirect cooling thereof to crystallize the wax and to incorporate the maximum amount of air with the wax crystals for the formation of a wax aerogel, carrying out the agitation and the cooling in each zone substantially independently of the similar operations being simultaneously performed in the other zones, controlling the formation and growth of the wax crystals by controlling the rate of cooling of the dispersion to avoid shock chilling thereof, continuously removing from the inner surface of said chamber any crystallized wax deposited thereon, and withdrawing a cooled, partially solidified dispersion from the other end of said system.

9. The method as claimed in claim 8, which includes maintaining the admixture in the first zone substantially at its introduction temperature to avoid premature and shock chilling thereof.

10. The method as claimed in claim 8, wherein the crystalline wax-containing wax-oil mixture comprises a slack wax containing over about ½% of petrolatum and which includes maintaining a temperature gradation through said zones of approximately 1 to 2° F. per zone.

11. The method as claimed in claim 8, in which the crystalline wax-containing wax-oil mixture comprises a wax-containing oil, the oil content of which amounts to more than about 30%, and which includes maintaining a temperature gradation through said zones of about 5° F. per zone.

12. The improvement as claimed in claim 8, which includes maintaining the rate of nucleation and the rate of nuclear growth of the wax crystals as near to their respective maxima as possible as the temperature of the dispersion is lowered by reason of the controlled gradual cooling.

13. The improvement as claimed in claim 8, which includes lowering the temperature of the crystallizing wax-oil dispersion in accordance with the decrease in the saturation temperature of the wax constituents as they are being crystallized by reason of the controlled gradual cooling.

WILLEM J. KLAASSEN.